United States Patent [19]

Masao et al.

[11] Patent Number: 5,489,212
[45] Date of Patent: Feb. 6, 1996

[54] ROTATING SIMULATOR AND BODY HOLDING APPARATUS THEREFOR

[75] Inventors: Masao Yoshimoto, Kanagawa; Nobushige Ishibashi, Tokyo, both of Japan

[73] Assignee: Sega Enterprises Ltd., Tokyo, Japan

[21] Appl. No.: 667,549

[22] Filed: Mar. 11, 1991

[30] Foreign Application Priority Data

Jul. 2, 1990 [JP] Japan .................. 2-70444 U
Jul. 2, 1990 [JP] Japan .................. 2-175125

[51] Int. Cl.⁶ .................................. A63G 31/00
[52] U.S. Cl. .................. 434/55; 434/34; 434/43; 434/45
[58] Field of Search .................. 472/1, 2, 3, 14, 472/16–19, 22, 23, 26, 44–46, 29, 30, 32, 35, 36; 434/29–32, 34, 35, 45, 55, 58, 140

[56] References Cited

U.S. PATENT DOCUMENTS 2,528,516 11/1950 Herrmann .................. 472/17 X
4,710,128 12/1987 Wachshuth et al. .................. 434/46
4,856,771 8/1989 Nelson et al. .................. 472/17 X Primary Examiner—Richard J. Apley
Assistant Examiner—Glenn E. Richman
Attorney, Agent, or Firm—Price, Gess & Ubell

[57] ABSTRACT

Disclosed is a simulator includes a substantially circular outer frame pivotally mounted on a base; an outer frame-driving tire which is pressed against an outer side of the outer frame by means of a spring disposed on the base and is adapted to drive the outer frame; an inner frame formed in a maneuvering seat and pivotally supported between opposing portions of an inner peripheral wall of the outer frame; and an inner frame-driving tire which is pressed against an inner side of the outer frame by means of a spring disposed within the inner frame and is adapted to drive the inner frame. Also disclosed is an occupant holding apparatus for use in the simulator.

6 Claims, 9 Drawing Sheets

ROTATING SIMULATOR AND BODY HOLDING APPARATUS THEREFOR

BACKGROUND OF THE INVENTION

1. Field of the Invention

The present invention relates to a simulator for simulating the experience of riding a futuristic riding machine or maneuvering a fighter plane, and more particularly to a simulator suitable for a simulation game. In addition, the present invention concerns an occupant holding apparatus for use in such a simulator or a rotating recreational machine adapted to rotate vertically and horizontally.

2. Description of the Related Art

Hitherto, various simulators for use in bodily sensation games have been developed. However, no simulators for games for realizing a 360° turn, such as a vertical somersault or a horizontal somersault, have been put to practical use.

Japanese Utility Model Application Laid-Open No. 58-180751 can be cited as a conventional occupant holding apparatus for a recreational riding machine such as a jet coaster found in an amusement park or the like.

In the aforementioned invention, there is disclosed an occupant holding apparatus for a recreational riding machine, comprising: an occupant's knee holding bar, a hydraulic cylinder in which a cylinder rod capable of moving forward and backward and having one end pivotally secured to an end of the knee holding bar is slidably inserted; a ropeway pipe having one end connected to the other end of the cylinder rod; a ratchet gear having one end connected to the other end of the ropeway pipe; and an occupant's shoulder holding arm secured to a shaft of the ratchet gear.

The occupant holding apparatus disclosed in the above-described embodiment is designed to hold the occupant's shoulder and knee portions. Although it is suitable for a jet coaster or the like, the apparatus is unsuitable as a occupant holding apparatus for use in a recreational machine or simulator adapted to rotate vertically in the place where it is disposed, since it is unable to secure the occupant onto a seat in the state in which the occupant is held upside down.

SUMMARY OF THE INVENTION

Accordingly, an object of the present invention is to provide a simulator capable of allowing an occupant to experience horizontal and vertical somersaults and the like and undergo simulated experience of minus G (gravity), and which permits unconventionally unlimited rotation.

To this end, in accordance with one aspect of the invention, there is provided a simulator comprising: a substantially circular outer frame pivotally mounted on a base; an outer frame-driving tire which is pressed against an outer side of the outer frame by means of a spring disposed on the base and is adapted to drive the outer frame; an inner frame formed in a maneuvering seat and pivotally supported between opposing portions of an inner peripheral wall of the outer frame; and an inner frame-driving tire which is pressed against an inner side of the outer frame by means of a spring disposed within the inner frame and is adapted to drive the inner frame.

Accordingly, in accordance with the present invention, in the case of simulating a role of a pilot of a jet fighter, when a horizontal somersault is shown on the screen of a cathode ray tube provided in the inner frame, the inner frame constituting the cockpit is rotatively driven by the drive tire to allow the occupant to undergo a horizontal somersault. When a vertical somersault is shown on the screen of the cathode ray tube, the outer frame is rotatively driven by the drive tire, with the result that the inner frame constituting the cockpit is rotated in the manner of a vertical somersault.

Another object of the present invention is to provide a body holding apparatus for firmly securing an occupant even in a state in which he or she is held upside down.

To this end, in accordance with another aspect of the invention, there is provided an occupant holding apparatus for a rotating recreational machine, comprising: a seat belt tip holding mechanism disposed at a distal end of an occupant holding arm for holding a frontal portion of the occupant, said occupant holding arm being vertically openable between a frontal upper side of a seat of said rotating recreational machine and a waist portion of the occupant with a horizontal axis in the rear of a head portion of said seat being set as a rotational axis. Tongues of a pair of seat belts for a waist secured to and paid out from transversely opposite sides of an underside of said seat are fitted with said seat belt tip holding mechanism.

Furthermore, in this occupant holding apparatus, a pair of seat belts for shoulders are secured at one ends thereof to a distal end of an occupant holding arm in such a manner that said seat belts are spaced apart a distance of the occupant's shoulders. The seat belts are passed through belt holes provided in a back portion of a seat with an interval corresponding to the length of the occupant's shoulders. The seat belts are passed around an auxiliary shaft secured to a rotating shaft of said occupant holding arm and behind a back of said seat, said rotating shaft of said occupant holding arm being located in the rear of said occupant holding arm. The seat belts are held under tension by being connected to a belt takeup mechanism disposed on an underside of said seat.

Additionally, in this occupant holding apparatus, the pair of seat belts for a waist are secured at one ends thereof to a pair of takeup mechanisms provided on transversely opposite sides of an underside of said seat, said pair of seat belts for a waist are paid out from the pair of takeup mechanisms via a belt tightening mechanism and passed around transversely opposite sides of said seat, and said pair of seat belts for a waist are detachably held by said seat belt tip holding mechanism.

Furthermore, in this occupant holding apparatus, a pair of turn rollers are provided for the seat belts for shoulders and a pair of seat belt direction-converting portions provided on opposite sides of said seat, and a pair of belt takeups are disposed below said pair of direction-converting portions, respectively. A belt tightening mechanism is disposed in a substantially intermediate position between said pair of direction-converting portions and said pair of takeups, and includes a pair of rollers arranged in parallel with each other and rotatably supported by a pair of elongated plates at opposite ends thereof, said belt tightening mechanism being rotatable about the center of each of said elongated plates. The pair of seat belts are wound around said pair of rollers, respectively. One ends of said pair of elongated plates are connected to one end of a seat belt tightening lever by means of a coupling mechanism. The tightening mechanism is adapted to be rotated by said rotating shaft by an operation of said seat belt tightening lever so as to tightenably support said seat belts of a waist by increasing the distance between the direction-converting portions for the seat belts for a waist and the respective takeups.

As a tongue insertion detecting means for detecting the insertion of a tongue into a retainer for retaining the tongue provided at the tip of the seat belt, a contacting piece is provided, and the operation of the contacting piece may be detected by a limit switch or a photocoupler.

In addition, in the occupant holding apparatus for a rotating recreational machine, said seat belt tip holding mechanism may comprise: a button member having a leg for depressing a projecting piece provided on said retainer; and a movable plate, such as a movable disk or a slidable plate, having a slot and disposed between said button member and said projecting piece. The movable plate is rendered movable by a driving portion, such as a solenoid coil or a hydraulic or air cylinder, connected to said movable plate. The leg of said button member is arranged to be capable of depressing said projecting piece of said retainer in conjunction with the movement of said movable plate so as to release said tongue from said retainer.

The occupant holding apparatus for a rotating recreational machine may further comprise a belt takeup mechanism in which a driving portion is provided in the rear of said belt takeups, and a ratchet pawl of each of said belt takeups is made disengageable from a ratchet pawl thereof by means of said driving portion.

The other objects, features and advantages of the invention will become more apparent from the following detailed description of the invention when read in conjunction with the accompanying drawings.

DETAILED DESCRIPTION OF THE PREFERRED EMBODIMENT

Referring now to the accompanying drawings, a description will be given of a preferred embodiment of a simulator in accordance with the present invention.

Figure 1:
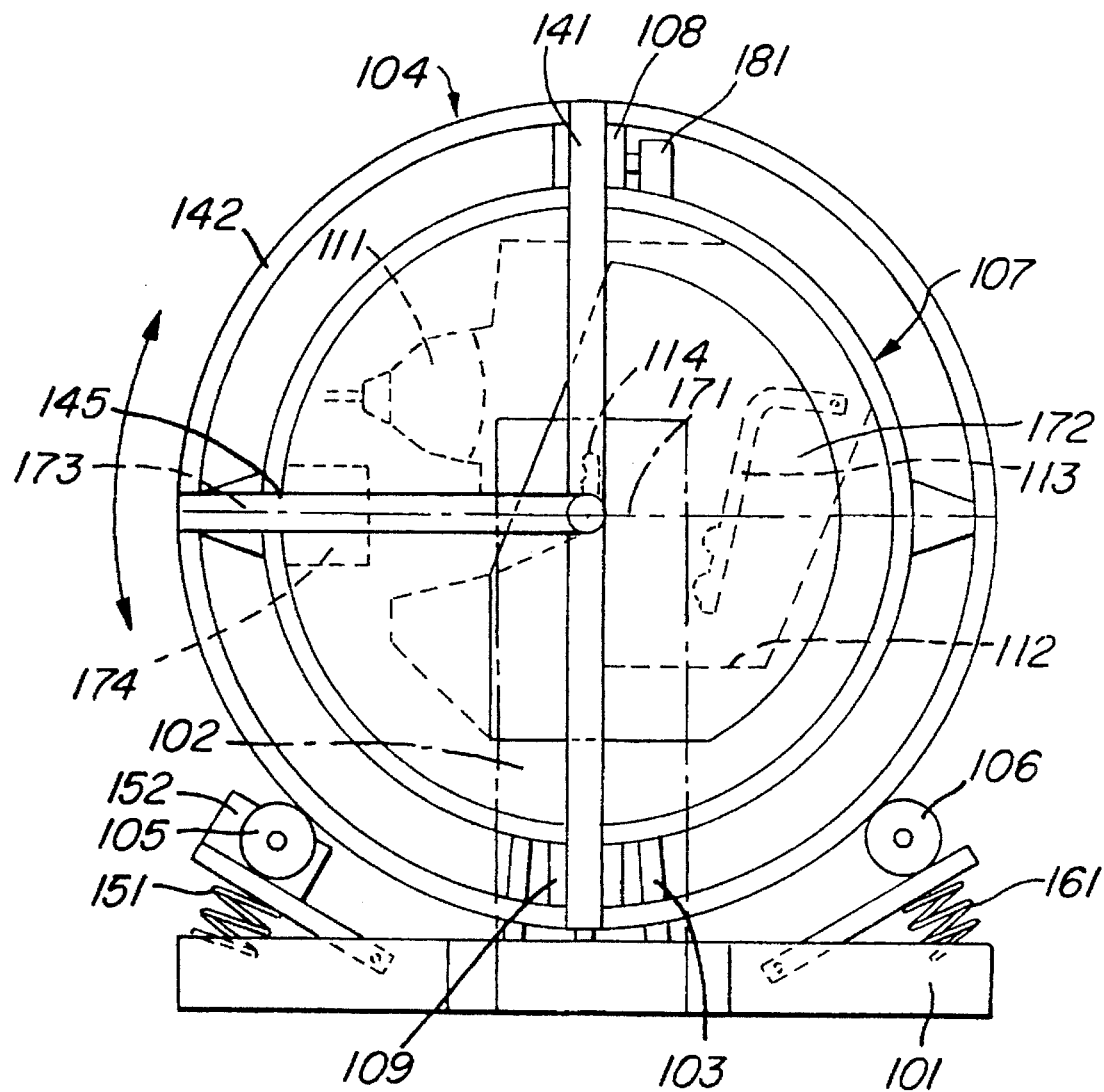
FIG. 1 is a front elevational view illustrating a simulator in accordance with an embodiment of the present invention.
Figure 2:
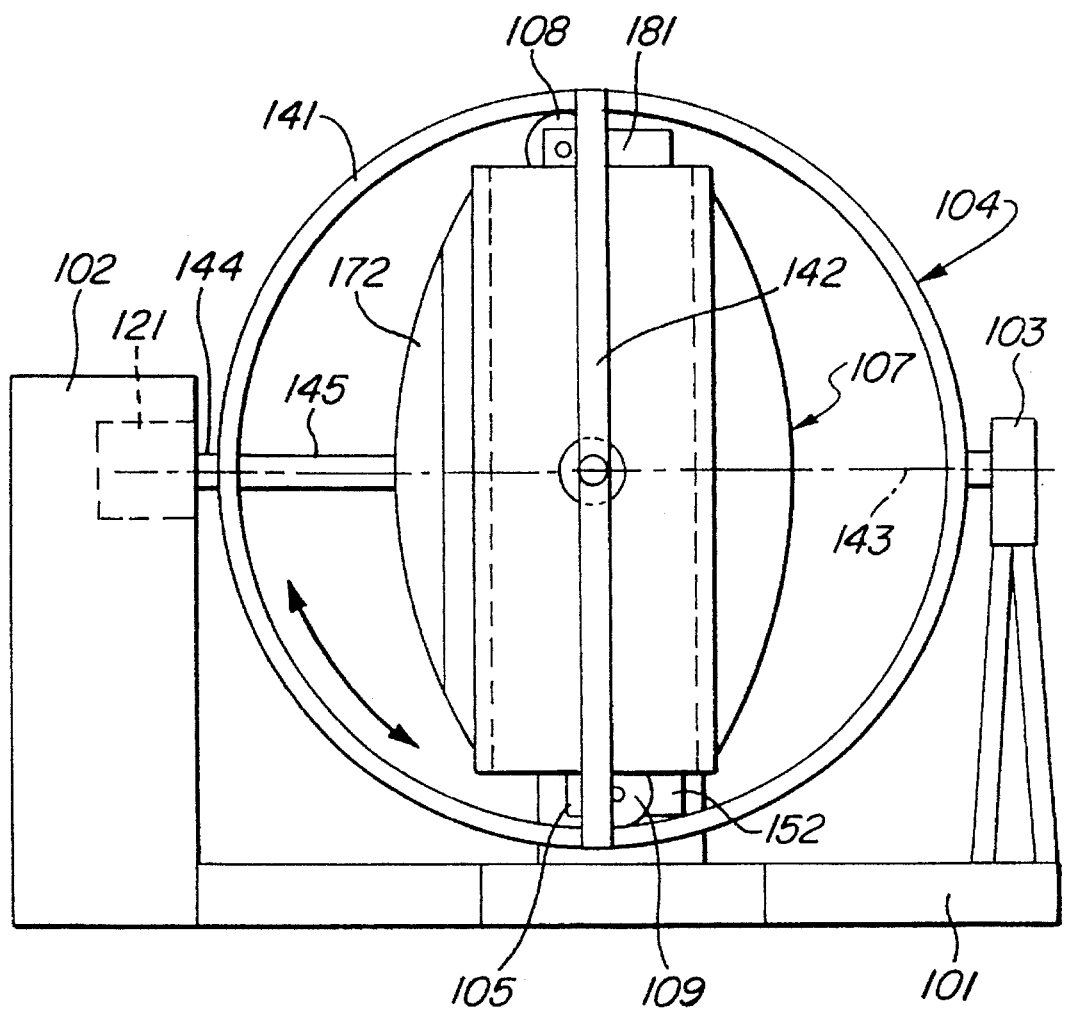
FIG. 2 is a side elevational view of the same.

In FIGS. 1 and 2, a base 101 constitutes a support for a simulator, and has a substantially octagonal configuration formed of a large, thick plate.

A columnar control box 102, which also serves as a bearing, is formed uprightly on a periphery of the base 101. An unillustrated controller is accommodated in the control box 102.

A bearing support column 103 is formed uprightly on a peripheral portion of the base 101 in face-to-face relationship with the control box 102.

An outer frame 104 comprises a large pivot ring 141 pivotally supported between the control box 102 and the support column 103 which together form a pair, and a similarly large drive ring 142 secured orthogonally to the pivot ring 141.

An arcuate arm 145 for a electric power supply line and a signal line is secured between a portion of the pivot ring 141 located close to the control box 102 and the drive ring 142.

A drive tire 105 for driving the outer frame 104 is pressed against an outer side of the drive ring 142 by means of a spring 151 disposed on the base 101. An electric motor 152 is used to drive the drive tire 105 so as to rotatively drive the outer frame 104 about a fixed axis 143.

An auxiliary tire 106 is provided as required, and is used to stabilize the rotation of the outer frame 104. The auxiliary tire 106 is pressed against the outer side of the drive ring 142 by means of a spring 161 disposed on the base 101.

An inner frame 107 is formed into a hollow, substantially disk-shaped cockpit and is pivotally supported by opposing portions of an inner peripheral wall of the drive ring 142.

A drive tire 108 for driving the inner frame 107 is pressed against an inner side of the pivot ring 141 by means of a spring (not shown) disposed in the inner frame 107. An electric motor 181 is used to drive the drive tire 108 so as to rotatively drive the inner frame 107 about a moving axis 171.

An auxiliary tire 109 is provided as required, and is used to stabilize the rotation of the inner frame 107. The auxiliary tire 109 is pressed against an inner side of the pivot ring 141 by means of a spring (not shown) provided in the inner frame 107.

It should be noted that although the drive tire 108 and the electric motor 181 are disposed on an upper side of the inner frame 107, it goes without saying that these members may be disposed on a lower side of the inner frame 107 by replacing the drive tire 108 with the auxiliary tire 109. In addition, no particular problem is presented in practical use even if the auxiliary tire 109 is omitted.

A door 172 is provided openably in a control box 102 side peripheral wall of the inner frame 107 which is a hollow, substantially disk-shaped cockpit. Accommodated in the inner frame 107 are a cathode-ray tube 111, a seat 112, a body holding arm 113 for safety, a control stick 114, and the like.

The electric power supply line for the overall apparatus is connected to the electric motor 181, the cathode-ray tube 111 and the like via a rotary connecting device 121 in the control box 102, a fixed-axis shaft 144, the arm 145, a moving-axis shaft 173, a rotary connecting device 174 in the inner frame 107, and the like.

It goes without saying that the signal line for a controller (not shown) such as a CPU is connected in the same way as the aforementioned electric power supply line.

In the operation of this embodiment arranged as described above, a player, i.e., an occupant, opens the door 172 and is seated in the seat 112. The occupant then wears the body holding arm 113, closes the door 172, and presses an unillustrated start button. Then, an image on the cathode-ray tube 111 changes. For instance, in the case of playing the role of a pilot of a jet fighter, when a horizontal somersault is shown on the screen, the inner frame 107, i.e., the cockpit, is rotated by the electric motor 181 and the drive tire 108 as shown by the double-headed arrow in FIG. 2. Meanwhile, when a vertical somersault is shown on the screen, the outer frame 104 is rotated by the electric motor 152 and the drive tire 105 as shown by the double-headed arrow in FIG. 1. As a result, the inner frame 107, i.e., the cockpit, is rotated as shown by the double-headed arrow shown in FIG. 1.

It goes without saying that the relationship between the image on the cathode-ray tube 111 and the rotation of the inner and outer frames 107, 104 need not be made to correspond with each other on a one-to-one basis, and that an optical illusion of human beings may be made use of.

Thus, the embodiment arranged as described above offers the advantage that the simulator with a very simple arrangement allows an occupant to experience horizontal and vertical somersaults, undergo a simulated experience of minus G, and experience unlimited rotation.

Figure 3:
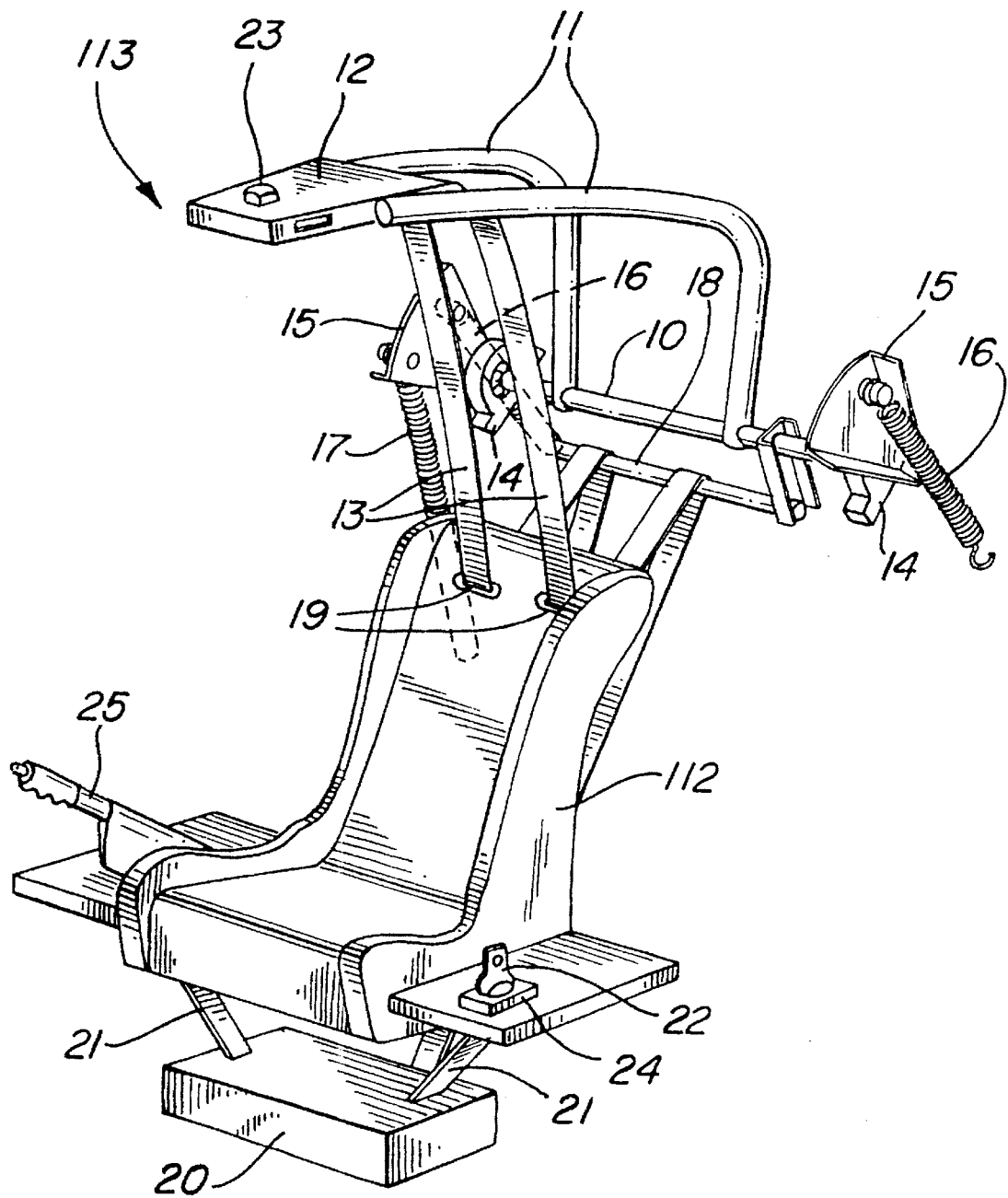
FIG. 3 is a diagram illustrating an initial state of an occupant holding apparatus.
Figure 4:
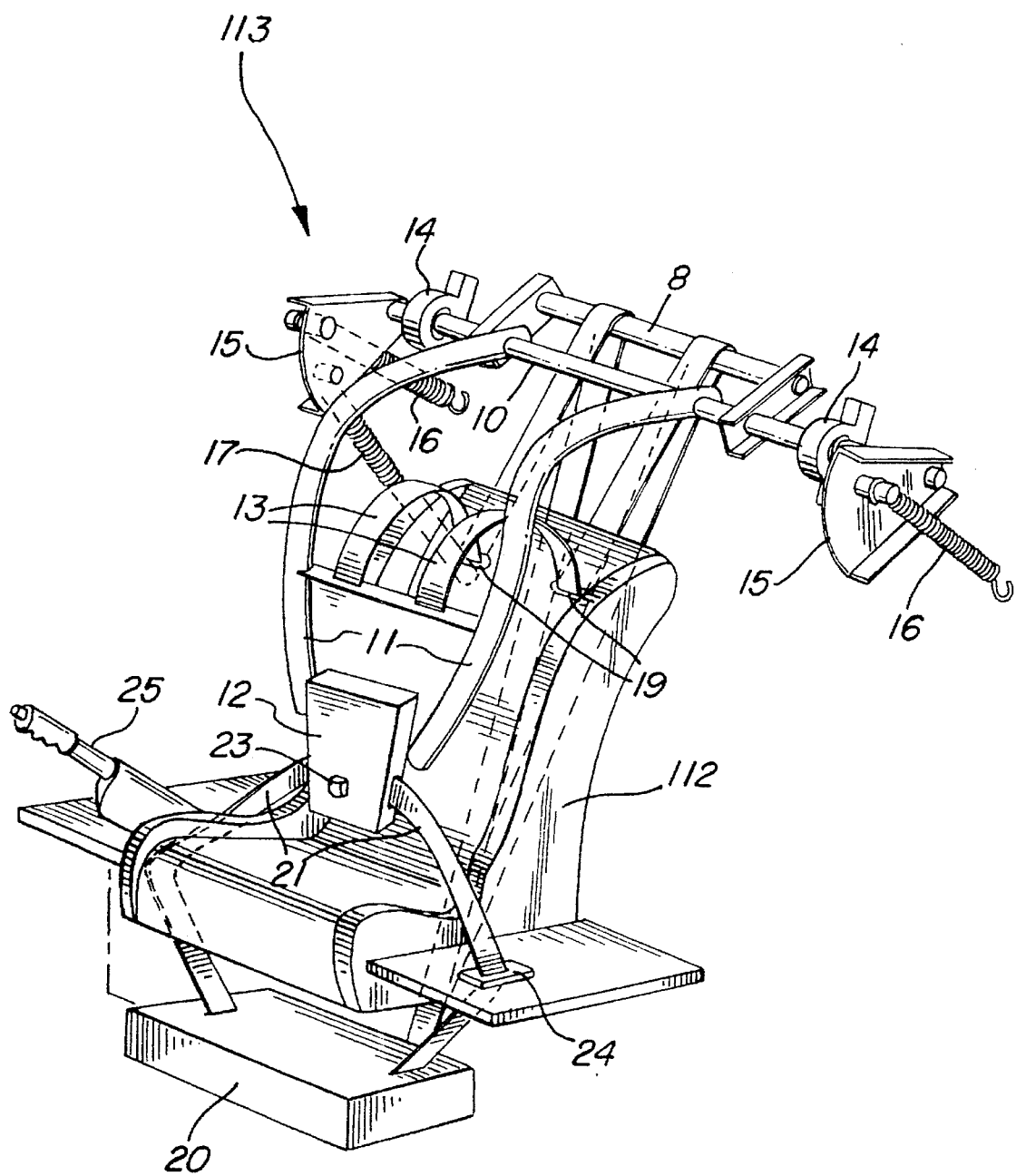
FIG. 4 is a diagram illustrating a state in which the apparatus is being applied to the occupant.

FIG. 3 illustrates an initial state of an occupant holding apparatus 113 for use in the simulator in accordance with the present invention. FIG. 4 illustrates a state in which the occupant holding apparatus 113 is applied to the occupant. The occupant holding apparatus 113 is mounted in a cockpit portion of the inner frame 107.

As shown in FIG. 4, the occupant holding apparatus 113 is arranged as follows: Upper ends of a pair of breast holding arms 11, which are curved in an L-shaped configuration as viewed from their side and are disposed in a substantially V-shaped configuration as viewed from their front, are spaced apart a distance substantially corresponding to the length of the occupant's shoulders and are secured to a shaft 10 held in such a manner as to be rotatable about a horizontal axis in the rear of the occupant's head in order to hold the occupant seated in a bucket-type seat 112.

A buckle lock mechanism 12 is disposed at a lower end of a triangular portion formed between the pair of breast holding arms 11, while a pair of seat belts 13 for holding the occupant's shoulders are spaced apart a distance substantially corresponding to the length of the occupant's shoulders, and one ends of the seat belts 13 are secured to an upper portion of the buckle lock mechanism 12. The pair of breast holding arms 11 are thus secured to the shaft 10. The shaft 10 has its opposite ends pivotally supported by the inner frame 107, i.e., the frame of the cockpit, by means of a pair of bearings 14, as shown in FIG. 4. The pair of breast holding arms 11 can be pushed upwardly on the front side of the occupant as they are rotated about the shaft 10 placed horizontally, as shown in FIG. 3. Proximal portions of a pair of fan-shaped members 15 are secured to opposite ends of the shaft 10. Each of a pair of tensile springs 16 has one end connected to an arcuate distal end portion of each fan-shaped member 15 and the other end to a portion of the cockpit portion 107 located in the rear of the shaft 10. Hence, when the breast holding arms 11 are pushed upwardly to the vicinity of a fully open position at an angle substantially orthogonal to a closed position, the tensile springs 16 urge the breast holding arms 11 in the opening direction, and urge them in the closing direction when they are at a position different from the aforementioned position. Furthermore, one end of a damper spring 17 is connected to a lower end of the arcuate distal end portion of the left-hand fan-shaped member 15, and the other end thereof is connected to the rear of the back of the seat 112 of the cockpit portion 107, so that the breast holding arms 11 are constantly urged upwardly. Thus, the damper spring 17 facilitates the opening and closing operation of the breast holding arms 11 in cooperation with the pair of tensile springs 16.

An auxiliary shaft 18 which is parallel with the shaft 10 is secured to the side of the shaft 10 which is opposite to the side to which the breast holding arms 11 are secured. The seat belts 13 for shoulders are passed through belt holes 19 provided in a shoulder portion of the seat 112. The other ends of the seat belts 13, after being passed around the auxiliary shaft 18, are accommodated in a retractor 20 placed underneath the seat 112.

Figure 5:
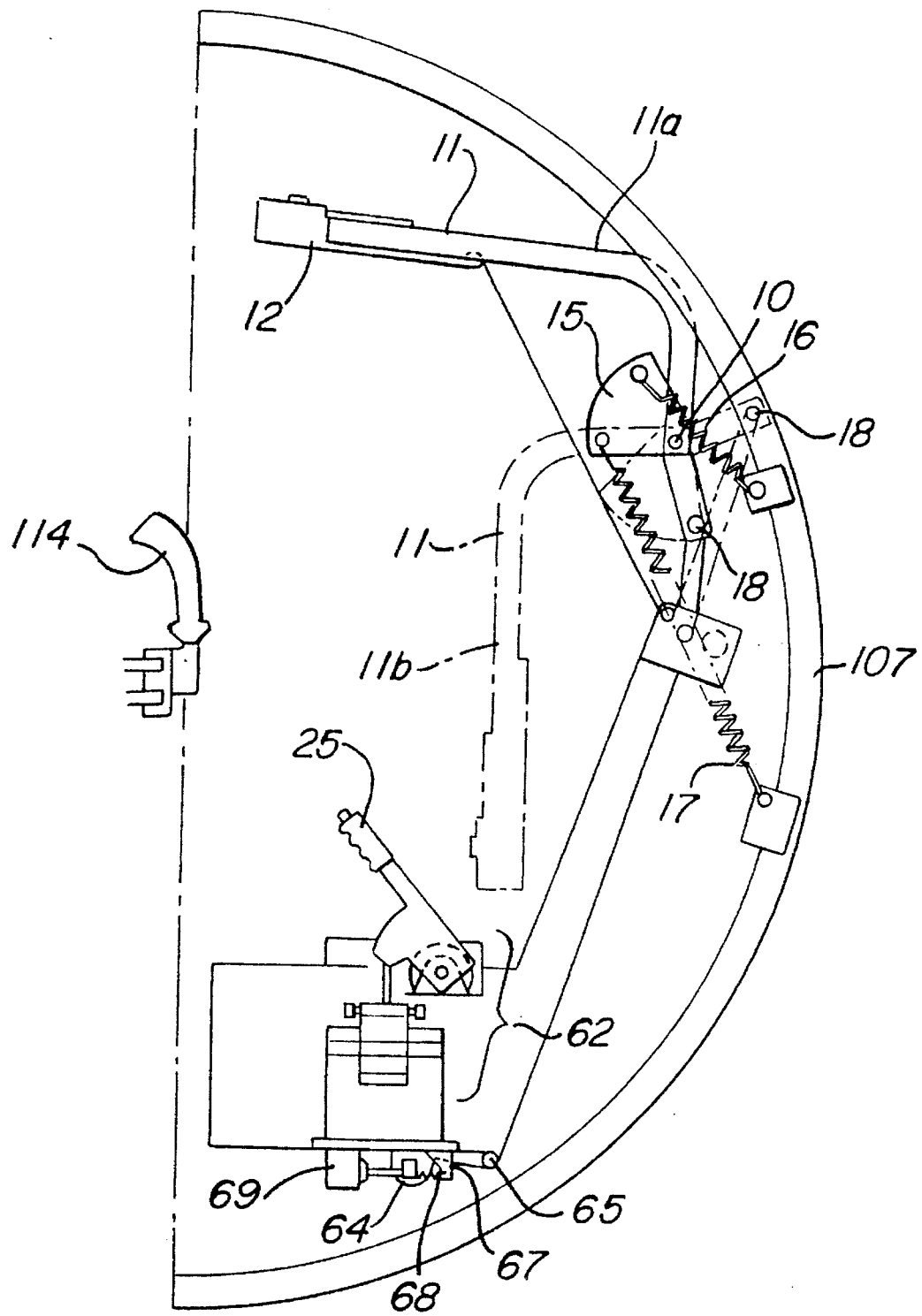
FIG. 5 is a side elevational view of the apparatus.

Since the auxiliary shaft 18 is secured to the opposite side of the breast holding arms 11, the auxiliary shaft 18 remains lowered to the vicinity of the belt holes 19 in a fully open state 11a (FIG. 3) of the breast holding arms 11, as shown in the side elevational view of the occupant holding apparatus illustrated in FIG. 5. On the other hand, in a closed state 11b (FIG. 4) of the breast holding arms 11, the auxiliary shaft 18 remains at a position distant from the belt holes 19 and the retractor 20. In other words, if the breast holding arms 11 are moved from the open state to the closed state, the effective length of the seat belts 13 for shoulders is increased by a portion of the reciprocating distance of the auxiliary shaft 18 when the auxiliary shaft 18 moves upwardly with the rotation of the shaft 10. The seat belts 13 are thus paid out from the retractor 20 and tighten the shoulders of the occupant. On the other hand, when the breast holding arms 11 are opened from the closed state, the seat belts 13 are loosened.

The buckle lock mechanism 12 is used to render detachable a pair of tongues 22 of seat belts 21 for the waist provided on the left and the right of the seat 112, one ends of the seat belts 21, i.e., the tongues 22, being engaged with the buckle lock mechanism 12 for securing the waist of the occupant. The arrangement provided is such that the seat belts 21 for the waist can be removed from the buckle lock mechanism 12 by pressing a button 23 provided on the buckle lock mechanism 12. The other ends of the seat belts 21 for the waist, after being passed through belt holes 24 provided in opposite side plates of the seat 112, are respectively accommodated in the retractor 20. After the tongues 22 of the seat belts 21 for the waist are engaged with the buckle lock mechanism 12, the seat belts 21 can be tightened by operating a belt tightening lever 25 provided on the right-hand side of the seat 112.

Figure 6:
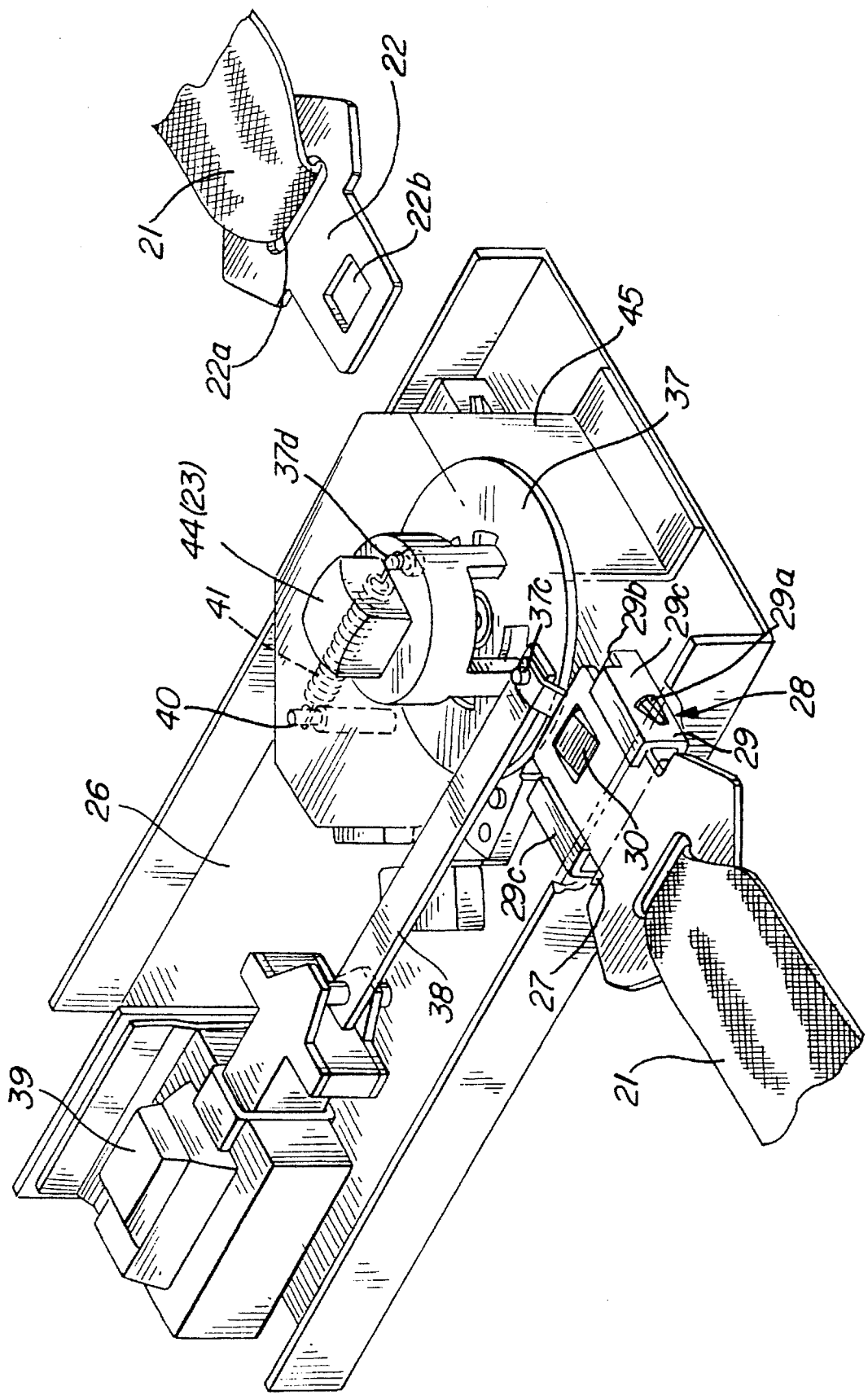
FIG. 6 is a perspective view of a buckle mechanism.
Figure 7:
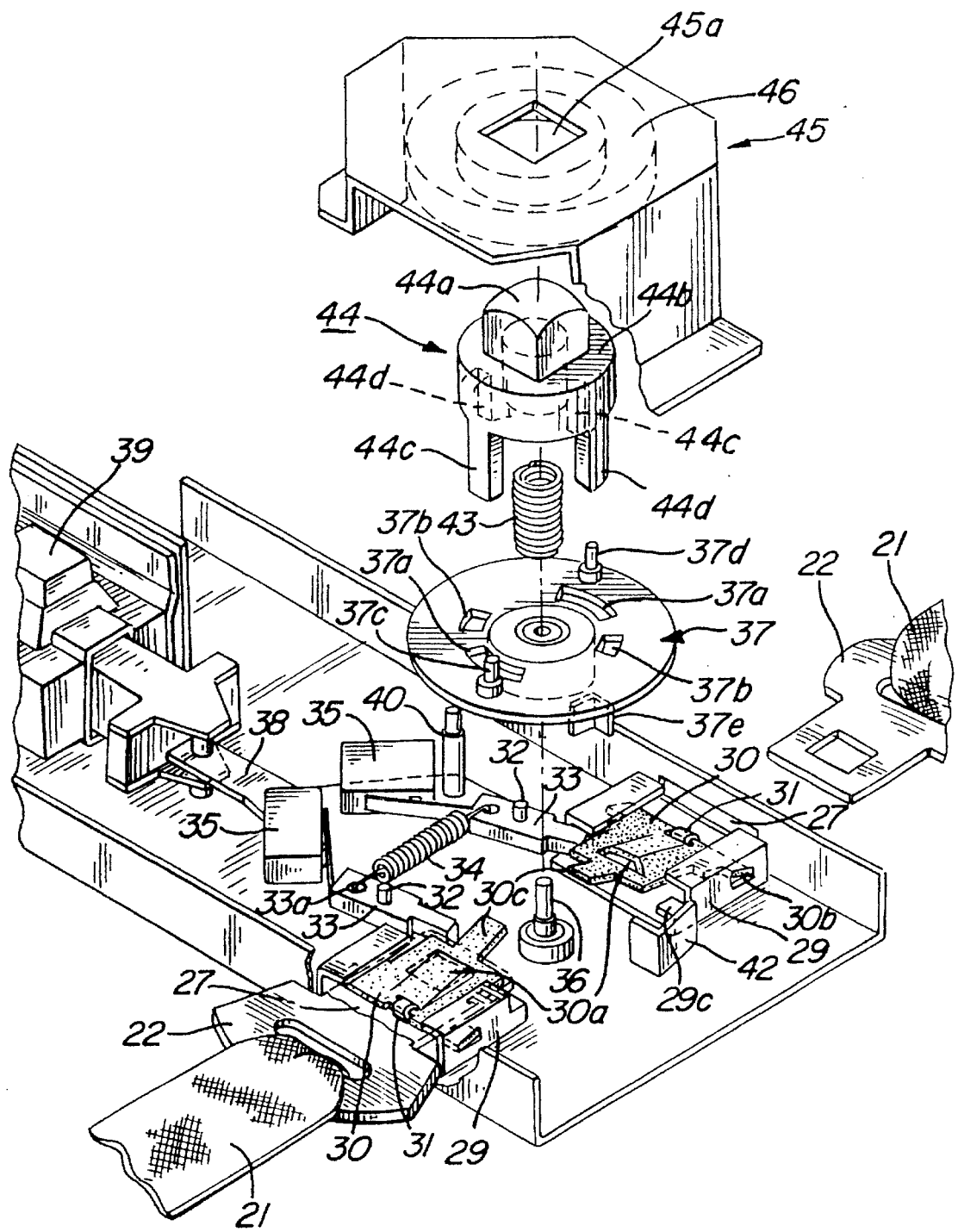
FIG. 7 is an exploded perspective view of the mechanism.

FIG. 6 illustrates a perspective view of the buckle lock mechanism, and an exploded perspective view of the mechanism is shown in FIG. 7. Each seat belt 21 for the waist is fixed in a transverse slot 22a of the tongue 22, and a tip of the tongue 22 has a smaller width than a rear-end portion thereof and is formed into a rectangular configuration, a rectangular hole 22b being provided in the tip thereof.

The buckle lock mechanism 12 is arranged such that opposite sides of a mounting base 26 are bent, a pair of rectangular tongue insertion holes 27 are respectively provided in bent side plates, and a buckle holding mechanism 28 is provided in each tongue insertion hole 27.

The buckle holding mechanism 28 is arranged in the same way as that of an automobile seat belt, and its cross section has a configuration in which legs of a staple are bent inwardly. As shown in FIG. 7, each of a pair of retaining portions 30b of a projecting retainer 30 is movably held in a hole 29a provided in a lower portion of each opposite side plate of a holder 29 into which the tip of the tongue 22 is inserted. In addition, each of a pair of tongue supporting pieces 29b whose height is half the height of the side plate of the holder 29 is provided at the farther end of each side plate of the holder 29 in such a manner as to project inwardly. A stepped projecting portion 30a is provided on a central portion of the retainer 30, and the pair of retaining portions 30b are provided on transversely opposite base portions of the retainer 30, respectively. A leaf spring 31 is provided on a central lower portion of the base portion of the retainer 30 so as to urge the retainer 30 downwardly, i.e., to press the retainer 30 toward the bottom surface of the holder 29.

Accordingly, if the tip of the tongue 22 is inserted into the holder 29 through the tongue insertion hole 27, the tongue is slid while being clamped by an upper side 29c of the holder 29 and the retainer 30 until it is placed on the tongue supporting pieces 29b, When the tongue 22 is inserted up to the innermost portion of the holder 29, the stepped portion 30a of the retainer 30 is released from the downward pressure by means of the rectangular hole 22b of the tongue, and is lifted upwardly by means of the resilient force of the leaf spring 31. As a result, the stepped portion 30a is latched in the rectangular hole 22b of the tongue.

Furthermore, two shafts 32 are embedded in the mounting base in the vicinity of farther corners of the holders 29, respectively. A contacting piece 33 transversely elongated relative to the longitudinal direction of the tongue 22 is rotatably held by each shaft 32 at a height for coming into contact with a shoulder portion of each retainer 30. The other end of each contacting piece 33 is provided with a hole 33a. A tensile spring 34 is fixed in these holes 33a so as to pull the contacting pieces 33. A limit switch 35 is provided on the side of the end of each contacting piece 33 where the hole is provided. Accordingly, when the tongue 22 is not retained by the retainer 30, the contacting piece 33 is placed on the shoulder portion of the retainer 30. When the tongue 22 is inserted into the tongue insertion hole 27 and is retained by the retainer 30, the contacting piece 33 is pushed by the tip of the tongue 22, and moves about the shaft 32. The movement of the contacting piece 33 overcomes the resilient force of the tensile spring 34, and turns on the limit switch 35 provided on the side of the holder 29 where the tongue 22 has been inserted. Although the contacting piece 33 is disposed between the retainer 30 and the limit switch 35, a contactor of the limit switch may be brought into direct contact with the shoulder portion of the retainer 30, or the insertion of the tongue 22 may be detected by means of a photocoupler.

A description will now be given of a mechanism for removing the tongue 22 from the retainer 30. A pivot 36 is embedded in an intermediate position between the two holders 29. A disk 37 whose diameter extends such as to span the holders 29 is rotatably mounted on the pivot 36 without contacting the holders 29 and the retainers 30. Two sets of slots 37a, 37b are provided in the disk 37 in the circumferential direction thereof so as to be located immediately above projections 30c provided on the tips of the retainers 30, respectively. The slot 37a, located immediately above the projection 30c and mating with the slot 37b, is configured in such a manner as to arcuately extend counterclockwise with respect to the projection 30c when the projection 30c is viewed from the disk side. The mating slot 37b is located at a position spaced apart clockwise with respect to the position of the projection 30c, and has a width corresponding to the width of the projection 30c. The other set of slots are arranged symmetrically about the center of the disk with respect to the above-described set of slots.

Supporting shafts 37c, 37d are embedded in the disk on the outer side of the slots 37a, and an elongated connecting member 38 is fixed to the supporting shaft 37c on this side and is connected to a solenoid coil 39 mounted in the rear of the mounting base 26. As the solenoid coil 38, a hydraulically or pneumatically operated cylinder may be used instead. In addition, a tensile spring 41 is stretched between the supporting shaft 37d and a supporting shaft 40 embedded on the right-hand side of the right-hand side limit switch 35, so as to constantly urge the disk 37 counterclockwise.

A retaining piece 37e is provided on a peripheral portion of the rear side of the disk 37 and abuts against a retaining piece 42 secured to the mounting base, so that the retaining piece 37e does not rotate further counterclockwise. This is the position in which the projection 30c of the retainer is located on the side of the notch 37a which is close to the notch 37b.

A pushbutton 44 is located in the center of the disk 37 via a compression spring 43. The pushbutton 44 is arranged such that its upper side is formed into a square column 44a and its lower side into a cylindrical column 44b. The diameter of the cylindrical column 44b is of a size which is within a circle defined by the outer edges of the notches 37a, 37b. Two long legs 44c and two short legs 44d penetrating the notches 37a, 37b are provided on the lower side of the cylindrical column 44b. Each of the long legs 44c penetrates the notch 37b side of the notch 37a down to the vicinity of the projection 30c of the retainer. The length of each of the short legs 44d is set in such a manner as to sufficiently enable the long legs 44c, when lowered, to push down the projection 30c of the retainer so as to disengage the tong 22 from the retainer 30. The long legs 44c and the short legs 44d are provided at positions corresponding to quarters of a circumference, respectively. The short legs 44d abut against the disk surface clockwise adjacent the notch 37b of the disk. Accordingly, in this state, even if the pushbutton 44 is pushed, the tongue 22 cannot be disengaged from the retainer 30.

Since the compression spring 43 is disposed between a central portion of the disk and an upper interior of the cylindrical column of the pushbutton, the pushbutton 44 is constantly urged upwardly. A square hole 45a conforming with the upper square column 44a of the pushbutton is provided in a central portion of a guide plate 45 set upright on the mounting base 26. A button guide 46, formed of a hollow short cylindrical column in conformity with the lower cylindrical column of the pushbutton, is provided around the square hole 45a. Thus, the pushbutton is mounted in such a manner as to be slidable vertically without rotating.

Here, if both of the tongues 22 are inserted into the holders 29, the tips of the tongues press the respective contacting pieces 33, which, in turn, turn on the limit switches 35. Thus, it is possible to detect that the occupant has worn the seat belts 21 for the waist, whereupon the simulator, or a rotating recreational machine, is ready to start its operation.

When the play is completed and the seat returns to the starting position, the solenoid coil 39 is energized. The solenoid coil 39 then pulls the connecting member 38 connected thereto, and the connecting member 38, in turn, rotates the disk 37 clockwise by overcoming the tensile spring 41, so that the disk is offset clockwise by the portion of the notch 37b. At this stage, if the pushbutton 44 is pressed, the long legs 44c are positioned on the opposite sides of the notches 37a, respectively, and the short legs 44d can penetrate the notches 37b. Then, the pushbutton 44 is pushed downwardly by overcoming the compression spring 43, and the long legs 44c push down the projections 30c of the retainers. As each of the projections 30c is lowered, the stepped portion 30a is disengaged from the square hole 22b in the tip of the tongue, and the contacting piece 33 acts in the direction of pushing back the tongue 22 by means of the pulling-back force of the tensile spring 34, thereby pushing out the tongue 22. Accordingly, the contacting piece 33 remains positioned on the shoulder portion of the retainer, turning off the limit switch 35. Thus, when the pushbutton 44 is pressed, the lower two long legs 44c of the pushbutton 44 push down the projections 30c of the retainers, respectively, thereby disengaging the tongues 22.

When the tongue 22 is inserted again into the tongue insertion hole 27 so as to be secured by the retainer 30, the energization of the solenoid coil 39 is stopped. Then, the disk 37 is returned counterclockwise by means of the action of the tensile spring 41 and is held at a position where the retaining piece 37e on the rear side of the disk and the retaining piece 42 on the mounting base abut against each other. In this state, even if the pushbutton 44 is pressed, it cannot be pressed down, so that the tongue 22 cannot be removed. This measure is adopted because it is very dangerous to remove the tongue 22 by pressing the pushbutton 44 during the operation of the rotating recreational machine.

Although the rotating disk 37 is used in this embodiment, it is possible to adopt the following arrangement: Instead of the rotating disk 37, a rectangular plate of a size which spans the holders 29 is provided with notches each located immediately above the projection 30c of the tongue. The rectangular plate is mounted slidably in the transverse direction relative to the longitudinal direction of the buckle 22. The rectangular plate is connected at its one end to the solenoid coil 39, and the other end of the rectangular plate is urged by a tensile spring. The arrangement provided is such that the long legs of the pushbutton can be engaged at the notches of the rectangular plate.

When the occupant is seated in the seat 112, the breast holding arms 11 are lowered to fit his or her body. Simultaneously with this operation, the seat belts 13 for shoulders are paid out over his or her shoulders via the belt holes 19 provided in the back of the seat, and reach the occupant's breast. As the breast holding arms 11 are lowered, the auxiliary shaft 18 is raised upwardly, thereby tightening the seat belts 13 for shoulders. Furthermore, the occupant pulls the seat belts 21 for the waist and cause them to be locked by the buckle lock mechanism 12. The occupant then pulls up the belt tightening lever 25 provided on his or her right-hand side of the seat so as to tighten the seat belts 21 until they fit his or her waist.

Figure 8:
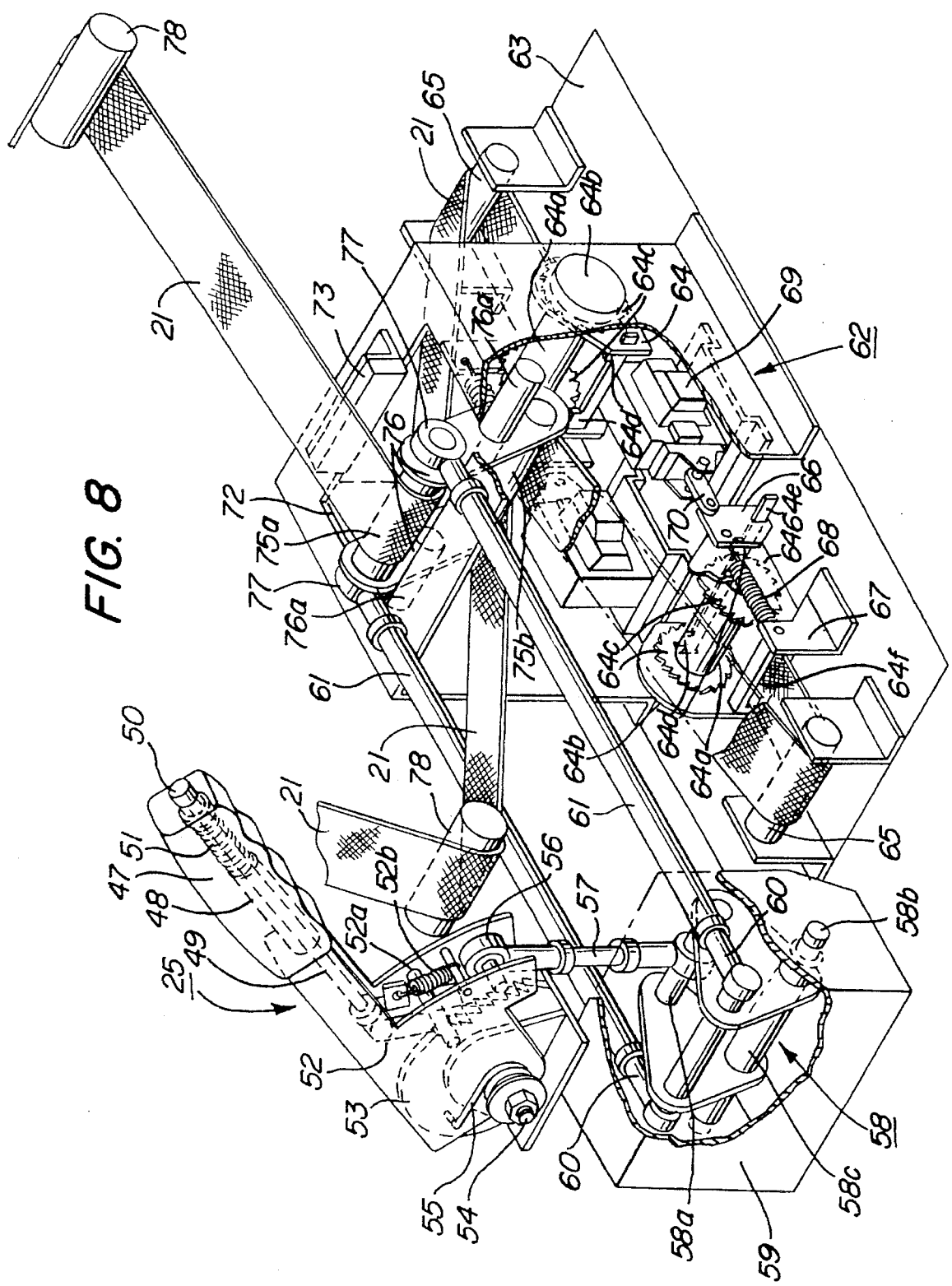
FIG. 8 is a perspective view of a mechanism for tightening seat belts for the waist.
Figure 9:
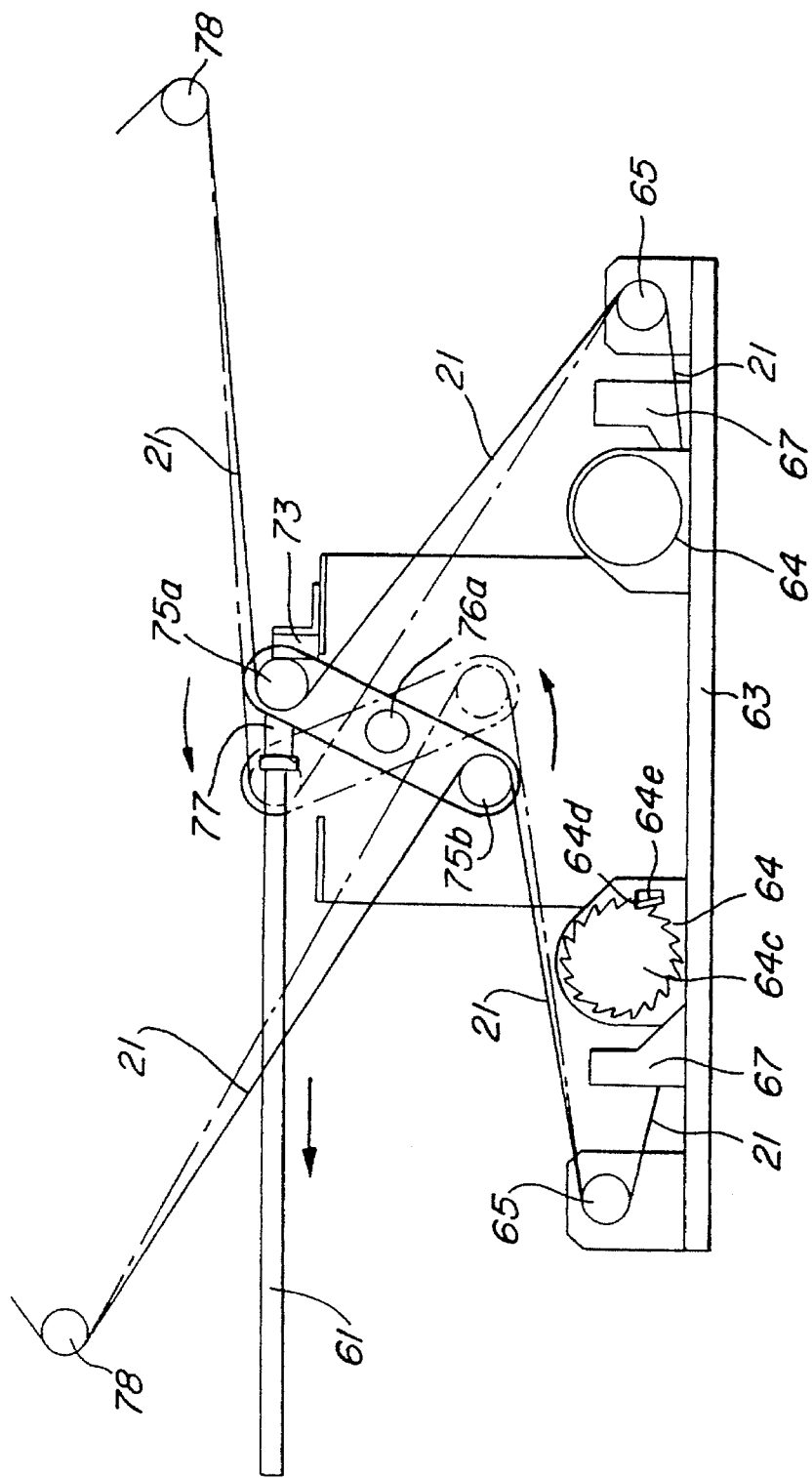
FIG. 9 is a front elevational view of the mechanism

FIG. 8 illustrates a perspective view of a mechanism for tightening seat belts for the waist, and FIG. 9 illustrates a front elevational view of essential portions of the mechanism.

The belt tightening lever 25 is similar to a lever employed for a side brake of an ordinary automobile. Specifically, a piston rod 49 is provided in a cylinder 48 of a grip 47 in such a manner as to be slidable in the longitudinal direction. A lever releasing button 50 is attached to a distal end of the piston rod 49. A compression spring 51 is provided between the cylinder 49 of the piston rod 49 and the lever releasing button 50. The piston rod 49 abuts against a ratchet pawl 52, which is mounted on a shaft 52a and abuts against a ratchet gear 53 by being urged by a tensile spring 52b. The belt tightening lever itself is urged downwardly by a helical spring 55 wound around a gear shaft 54. Since the ratchet gear 53 is retained by the ratchet pawl 52, the belt tightening lever 25 is prevented from being lowered in this state.

Upon pressing the lever releasing button 50, the piston rod 49 is pushed, which in turn pushes the ratchet pawl 52, so that the pawl is disengaged from the ratchet gear 53, thereby making it possible to lower the belt tightening lever 25. If the occupant releases his or her finger from the lever releasing button 50, the lever releasing button 50 returns to its original position by means of the resilient force of the compression spring 51. As a result, the piston rod 49 is pulled back, and the ratchet pawl 52 is engaged with the ratchet gear 53 by means of the resilient force of the tensile spring 52b, thereby holding the belt tightening lever 25 in that position.

An upper end of a connecting rod 57 is connected via a rod end 56 to a shaft mounted transversely between opposite side plates of a lower portion of the belt tightening lever 25. A lower end of the connecting rod 57 is fixed via a rod end to a central portion of a mounting shaft 58a disposed at an end of a bell crank 58. Thus, the vertical motion of the belt tightening lever 25 is transmitted to the bell crank 58.

The bell crank 58 is arranged as follows: Two plates both shaped into a rectangular equilateral triangle are arranged in parallel with each other in such a manner as to be rotatable about a rotating shaft 58b which is secured in their right-angled portions and is pivotally supported in side plates of a bracket 59. A pair of horizontal rods 61 are respectively mounted via rod ends 60 on opposite ends of a mounting shaft 58c penetrating the vicinity of an upper apex of the bell crank 58. The horizontal rods 61 at the other ends are secured to the belt tightening mechanism 62.

The belt tightening mechanism 62 is located below the seat 112, and a pair of retractors 64 of ELR (emergency locking retractor) seat belts are provided transversely symmetrically on the left- and right-hand sides of a rectangular mounting base 63. The retractor 64 is arranged to take up the seat belt onto it by means of a spiral spring 64b disposed on an outer side of a takeup shaft 64a. A pair of ratchet gears 64c are respectively secured to opposite ends of the takeup shaft 64a interiorly of a pair of brackets provided for the takeup shaft 64a. A transversely elongated member 64e provided with a ratchet pawl 64d for meshing with the ratchet gear 64c extends between the brackets. One end of the ratchet pawl 64d projects outwardly of the bracket, so that the ratchet pawl 64d can engage or disengage with the ratchet gear 64c.

A turn roller 65 is provided outside a seat belt takeup port 64f of the retractor 64. A rectangular member 66 with one corner cut off is mounted on the transversely elongated member 64e projecting from one side of the retractor 64. A tensile spring 68 is stretched between one end of the rectangular member 66 and a support member 67 mounted on the mounting base at a position close to the seat belt takeup port 64f of the retractor. A solenoid coil 69 is secured to the mounting base 63 on the opposite side of the support member 67 with the rectangular member 66 placed therebetween. The solenoid coil 69 is connected to an upper end of the rectangular member 66 by means of a connecting member 70. When the solenoid coil 69 is energized, the connecting member 70 is pulled to incline the transversely elongated member 64e via the rectangular member 66, thereby disengaging the ratchet pawl 64d from the ratchet gear 64c. Thus, it is possible to release the takeup shaft 64a and pull out the seat belt freely by overcoming the spiral spring 64b. When the energization of the solenoid coil 69 is stopped, the rectangular member 66 is inclined toward the support member 67 by the tensile force of the tensile spring 68, which in turn causes the ratchet pawl 64d to engage with the ratchet gear 64c, thereby stopping the paying out of the seat belt from the takeup shaft 64a. A hydraulic or pneumatic cylinder may be used instead of the solenoid coil 69.

The above-described takeup mechanism corresponds to the seat belt 21 for the waist provided on the left-hand side in FIG. 8, and an identical takeup mechanism corresponding to the seat belt 21 for the waist provided on the right-hand side is provided on the right-hand side of the mechanism.

Another takeup mechanism, which is identical with the one described above and comprises the retractor 64, the support member 67, the solenoid coil 69, and the like, is provided underneath the central portion of the underside of the seat, as shown in FIG. 5. The seat belts for shoulders, after being passed through the belt holes 19, are connected to this takeup mechanism.

A bracket 71 whose transverse sides are made open is mounted on a central portion of the mounting base, and a square opening 72 is provided in a central portion of an upper plate of the bracket 71. A bumper member 73 is secured to the right-hand side of the square opening 72. The tightening mechanism is arranged such that two rollers 75a, 75b having substantially the same size as the aforementioned turn roller 65 are arranged parallel with each other and are rotatably supported by two elongated plates 76 at their opposite ends. Each of a pair of support shafts 76a is provided on a central portion of the outer side of each elongated plate 76 in parallel with the rollers 75a, 75b. One roller 75a projects upwardly from the square opening 72 provided in the upper plate of the bracket, and a support shaft of the roller 75a is connected at its opposite ends to the horizontal rods 61 via rod ends 77 disposed outside the upper ends of the elongated plates 76.

The seat belt 21 for the waist disposed on the right-hand side of the occupant (the left-hand seat belt 21 in FIG. 8) is paid out from the left-hand retractor 64, as viewed in the drawing, and is passed around the turn roller 65, the lower roller 75b of the tightening mechanism 74, and the turn roller 78 located on the right-hand side of the seat belt tightening lever 25 as viewed in the drawing. This seat belt 21 is then passed through the belt hole 24 and is sewn onto the tongue 22. Similarly, the seat belt 21 for the waist disposed on the left-hand side of the occupant (the right-hand side seat belt 21 in FIG. 8) is paid out from the right-hand retractor 64, as viewed in the drawing, and is passed around the turn roller 65, the upper roller 75a of the tightening mechanism 74, and the turn roller 78 shown at upper right in FIG. 8. This seat belt 21 is then passed through the belt hole 24 and is sewn onto the tongue 22.

Although in the above-described embodiment the operation of the seat belt tightening lever is transmitted to the belt tightening mechanism via the bell crank, it is apparent that the operation of the seat belt tightening lever may be transmitted to the seat belt tightening mechanism by adopting a clad wire used in a brake for a bicycle and the like.

In operation, after the occupant or the player is seated in a cockpit portion of the rotating recreational machine, he or she lowers the breast holding arms ad fits them to his or her body. At that time, the seat belts for shoulders are applied to his or her breast by being paid out behind the back of the seat, around the auxiliary shaft, through the belt holes provided in the back of the seat, and around the occupant's back. As the breast holding arms are lowered, the auxiliary shaft is raised upwardly, which causes the seat belts for shoulders to be paid out from the retractor provided on the underside of the seat, and a pulling force of a fixed strength by means of the resilient force of the spiral spring of the retractor is applied to the seat belts for shoulders. Hence, the occupant is capable of wearing the seat belts for shoulders in conformity with his or her shoulders and without free play around his or her shoulders.

When the position of the breast holding arms is determined, the left and right seat belts for the waist are pulled and are locked by the buckle lock mechanism. Then, if the belt tightening lever provided on a side of the seat is pulled upwardly, the connecting rod connected to the belt tightening lever pulls up the bell crank counterclockwise. The two horizontal rods connected to the bell crank rotate the tightening mechanism counterclockwise, which in turn causes the rollers mounted on the tightening mechanism to move counterclockwise, as shown in a front elevational view of the seat belt tightening mechanism in FIG. 9. Hence, it is possible to increase the distance of the seat belt between the turn roller provided on the mounting base and the turn roller provided by the side of the seat. The seat belts for the waist are thus tightened until they fit the occupant's waist.

When the occupant completes the above-described operation and presses a start button (not shown) for starting the rotating recreational machine, driving portions such as a solenoid coil of each seat belt takeup mechanism are reset, the rectangular member which has retained the ratchet pawl of each retractor causes the ratchet pawl to engage with the ratchet gear by means of the action of the tensile spring. As a result, the takeup shaft to which the ratchet gear is secured does not pay out the seat belt any longer and is fixed at that position. In addition, the driving portions such as the solenoid coil and the like of the buckle lock mechanism are also reset, and the movable plate such as the disk is returned in the opposite direction by means of the action of a tensile spring, which makes it impossible to press down the pushbutton, thereby making it impossible to remove the tongues.

Accordingly, when the occupant is seated in the seat and causes the breast holding arms to abut against his or her body, his or her weight can be supported by the breast holding arms even if the seat moves vertically. In addition, it is possible to prevent the occupant's body from moving upwardly by means of the seat belts for shoulders, and fix the occupant's waist to the seat by means of the left and right seat belts for the waist, thereby preventing the occupant's body from being moving from the seat. Furthermore, the buckle lock mechanism ensures that, after the seat belts for the waist are worn, the occupant him- or herself cannot remove the seat belts until safety is guaranteed, thereby maintaining safety.

What is claimed is:

1. A video simulation apparatus comprising:

a base including two vertical support members;

an outer frame including a circular outer ring, the outer frame pivotally coupled to the two vertical support members for rotation about a first horizontal axis extending between and through the two vertical support members, the outer frame further including a drive ring secured orthogonally to the circular outer ring;

first means coupled between the base and the drive ring for rotating the outer frame about the first horizontal axis;

an inner frame pivotally coupled to the drive ring about a second axis orthogonal to the first horizontal axis, the inner frame including a cockpit, a video display, and input control for the video simulation;

power supply means for providing power to the video display, including an arcuate arm member, a first rotary connecting member, and a second rotary connecting member, the first rotary connecting member is connected to one of the vertical support members and the second rotary connecting member is connected to the inner frame whereby the arcuate arm member is connected between the first and second rotary connecting members and can rotate relative to each of the first and second rotary connecting members; and second means coupled between the inner frame and the circular outer ring for rotating the inner frame about the second axis.

2. A simulator according to claim 1, further comprising a seat and an occupant's body holding apparatus which are provided within said inner frame.

3. A video simulation apparatus as in claim 1 wherein the first means is mounted to the base and includes an outer drive tire aligned with the outer side of the drive ring, an outer drive spring for biasing the outer drive tire against the outer side of the drive ring, and a motor for rotating the outer drive tire.

4. A video simulation apparatus as in claim 3 wherein the first means is mounted substantially below and to one side of the outer frame; an outer support tire is mounted to the base, aligned with the outer side of the drive ring, and symmetrically positioned below and to the other side of the outer ring; and an outer support spring biases the outer support tire against the outer side of the drive ring.

5. A video simulation apparatus as in claim 4 wherein the second means is mounted to the inner frame and includes an inner drive tire aligned with the inner side of the circular outer ring, an inner drive spring for biasing the inner drive tire against the inner side of the circular outer ring, and a motor for rotating the inner drive tire.

6. A video simulation apparatus as in claim 5 wherein the second means includes an inner support tire mounted to the inner frame and aligned with the inner side of the circular outer ring in a position diametrically opposed to the inner drive tire, and an inner support spring biases the inner support tire against the inner side of the circular outer ring.

* * * * *